United States Patent
Satish et al.

(10) Patent No.: US 10,834,120 B2
(45) Date of Patent: Nov. 10, 2020

(54) IDENTIFYING RELATED COMMUNICATION INTERACTIONS TO A SECURITY THREAT IN A COMPUTING ENVIRONMENT

(71) Applicant: SPLUNK INC., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 14/868,553

(22) Filed: Sep. 29, 2015

(65) Prior Publication Data

US 2016/0164892 A1     Jun. 9, 2016

Related U.S. Application Data

(60) Provisional application No. 62/087,025, filed on Dec. 3, 2014, provisional application No. 62/106,830, filed
(Continued)

(51) Int. Cl.
*H04L 29/06*     (2006.01)
*G06F 21/55*     (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC . H04L 63/02; H04L 63/0227; H04L 63/0263; H04L 63/14; H04L 63/1408;
(Continued)

(56) References Cited

U.S. PATENT DOCUMENTS 6,405,318 B1     6/2002  Rowland
7,076,803 B2     7/2006  Bruton et al.
(Continued)

OTHER PUBLICATIONS

Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
(Continued)

*Primary Examiner* — Shanto Abedin
*Assistant Examiner* — Adrian Stoica
(74) *Attorney, Agent, or Firm* — Nicholson De Vos Webster & Elliott LLP

(57) ABSTRACT

Systems, methods, and software described herein provide security actions based on related security threat communications. In one example, a method of operating an advisement system includes identifying a security threat within the computing environment, wherein the computing environment comprises a plurality of computing assets. The method further provides obtaining descriptor information for the security threat, and retrieving related communication interactions based on the descriptor information. The method also includes generating a response to the security threat based on the related communication interactions.

20 Claims, 4 Drawing Sheets

Related U.S. Application Data on Jan. 23, 2015, provisional application No. 62/106,837, filed on Jan. 23, 2015.

(51) Int. Cl.
  *G06F 16/28* (2019.01)
  *H04L 12/851* (2013.01)

(52) U.S. Cl.
  CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
  CPC ............. H04L 63/1416; H04L 63/1425; H04L 63/1433; H04L 63/1441; H04L 63/1483; H04L 63/20; H04L 63/00; H04L 63/08; H04L 63/0853; H04L 63/16; G06F 17/3053; G06F 17/30595; G06F 17/30598; G06F 21/55; G06F 21/552; G06F 21/554; G06F 21/56; G06F 21/566; G06F 16/28; G06F 16/284; G06F 16/285
  See application file for complete search history.

(56) References Cited

U.S. PATENT DOCUMENTS

| | | |
|---|---|---|
| 7,127,743 B1 | 10/2006 | Khanolkar et al. |
| 7,174,566 B2 | 2/2007 | Yadav |
| 7,469,301 B2 | 12/2008 | Daniell et al. |
| 7,617,533 B1 | 11/2009 | Hernacki |
| 7,900,259 B2 | 3/2011 | Jeschke et al. |
| 7,950,056 B1 | 5/2011 | Satish et al. |
| 8,042,171 B1 | 10/2011 | Nordstrom et al. |
| 8,103,875 B1* | 1/2012 | Ramzan .................. H04L 51/12 713/170 |
| 8,146,147 B2 | 3/2012 | Litvin et al. |
| 8,185,953 B2 | 5/2012 | Rothstein et al. |
| 8,261,317 B2 | 9/2012 | Litvin et al. |
| 8,291,495 B1 | 10/2012 | Burns et al. |
| 8,380,828 B1 | 2/2013 | Schlichter et al. |
| 8,402,540 B2 | 3/2013 | Kapoor et al. |
| 8,484,338 B2* | 7/2013 | Paster ................ H04L 41/5058 709/224 |
| 8,516,575 B2 | 8/2013 | Burnside et al. |
| 8,627,466 B2 | 1/2014 | Fisher |
| 8,676,970 B2 | 3/2014 | Boyns et al. |
| 8,756,697 B2 | 6/2014 | Ocepek et al. |
| 8,856,910 B1 | 10/2014 | Rostami-Hesarsorkh et al. |
| 8,914,878 B2 | 12/2014 | Burns et al. |
| 8,924,469 B2 | 12/2014 | Raleigh et al. |
| 8,943,123 B2 | 1/2015 | Miyazaki et al. |
| 8,949,931 B2 | 2/2015 | Ermagan et al. |
| 8,955,107 B2 | 2/2015 | Eyada |
| 9,009,814 B1 | 4/2015 | Wertz et al. |
| 9,009,824 B1* | 4/2015 | Chen .................. H04L 63/1425 726/22 |
| 9,049,226 B1 | 6/2015 | Duane |
| 9,166,995 B1 | 10/2015 | Roundy |
| 9,231,964 B2 | 1/2016 | Cross et al. |
| 9,256,739 B1 | 2/2016 | Roundy |
| 9,306,965 B1 | 4/2016 | Grossman et al. |
| 9,311,479 B1* | 4/2016 | Manni ................. H04L 63/1416 |
| 9,313,211 B1 | 4/2016 | Lototskiy |
| 9,325,733 B1 | 4/2016 | Kolman |
| 9,336,385 B1 | 5/2016 | Spencer et al. |
| 9,338,181 B1 | 5/2016 | Burns et al. |
| 9,344,445 B2 | 5/2016 | Burns et al. |
| 9,378,361 B1 | 6/2016 | Yen et al. |
| 9,489,516 B1 | 11/2016 | Lu et al. |
| 9,712,555 B2 | 7/2017 | Satish et al. |
| 9,729,572 B1 | 8/2017 | Adams et al. |
| 9,762,607 B2 | 9/2017 | Satish et al. |
| 9,871,818 B2 | 1/2018 | Satish et al. |
| 9,954,888 B2 | 4/2018 | Satish et al. |
| 10,158,663 B2 | 12/2018 | Satish et al. |
| 10,257,227 B1 | 4/2019 | Stickle et al. |
| 10,476,905 B2 | 11/2019 | Satish et al. |
| 2004/0003286 A1 | 1/2004 | Kaler |
| 2004/0054498 A1* | 3/2004 | Shipp .................... G06F 21/562 702/182 |
| 2004/0111637 A1 | 6/2004 | Baffes et al. |
| 2004/0250133 A1 | 12/2004 | Lim |
| 2005/0055578 A1 | 3/2005 | Wright et al. |
| 2005/0235360 A1 | 10/2005 | Pearson |
| 2006/0048209 A1 | 3/2006 | Shelest |
| 2006/0095965 A1 | 5/2006 | Phillips et al. |
| 2006/0117386 A1 | 6/2006 | Gupta et al. |
| 2007/0168874 A1 | 7/2007 | Kloeffer et al. |
| 2008/0005782 A1* | 1/2008 | Aziz .................... G06F 9/45537 726/3 |
| 2008/0082662 A1* | 4/2008 | Dandliker ............... H04L 63/10 709/225 |
| 2008/0289028 A1 | 11/2008 | Jansen et al. |
| 2009/0037548 A1 | 2/2009 | Ordille et al. |
| 2010/0100962 A1 | 4/2010 | Boren |
| 2010/0162347 A1 | 6/2010 | Barile |
| 2010/0169973 A1 | 7/2010 | Kim et al. |
| 2010/0251329 A1* | 9/2010 | Wei ..................... H04L 63/1408 726/1 |
| 2010/0319004 A1 | 12/2010 | Hudson |
| 2010/0319069 A1 | 12/2010 | Granstedt et al. |
| 2010/0325412 A1 | 12/2010 | Norrman et al. |
| 2010/0325685 A1 | 12/2010 | Sanbower |
| 2012/0210434 A1 | 8/2012 | Curtis et al. |
| 2012/0224057 A1 | 9/2012 | Gill et al. |
| 2012/0331553 A1* | 12/2012 | Aziz .................... G06F 21/554 726/23 |
| 2013/0007882 A1* | 1/2013 | Devarajan ............ H04L 63/1416 726/24 |
| 2013/0081141 A1 | 3/2013 | Anurag |
| 2013/0291106 A1 | 10/2013 | Simonoff |
| 2013/0312092 A1 | 11/2013 | Parker |
| 2014/0082726 A1* | 3/2014 | Dreller .................. G06Q 10/04 726/23 |
| 2014/0137257 A1 | 5/2014 | Martinez et al. |
| 2014/0165200 A1 | 6/2014 | Singla |
| 2014/0165207 A1 | 6/2014 | Engel |
| 2014/0199663 A1* | 7/2014 | Sadeh-Koniecpol .... G09B 5/00 434/118 |
| 2014/0237599 A1 | 8/2014 | Gertner |
| 2014/0259170 A1 | 9/2014 | Amsler |
| 2014/0310811 A1 | 10/2014 | Hentunen |
| 2014/0344926 A1 | 11/2014 | Cunningham |
| 2014/0351441 A1 | 11/2014 | Madani et al. |
| 2014/0351940 A1 | 11/2014 | Loder et al. |
| 2015/0040217 A1 | 2/2015 | Abuelsaad et al. |
| 2015/0215325 A1 | 7/2015 | Ogawa |
| 2015/0222647 A1 | 8/2015 | Lietz et al. |
| 2015/0304169 A1 | 10/2015 | Milman et al. |
| 2015/0334132 A1 | 11/2015 | Zombik et al. |
| 2015/0341384 A1 | 11/2015 | Mandayam et al. |
| 2015/0347751 A1 | 12/2015 | Card et al. |
| 2015/0365438 A1* | 12/2015 | Carver ................ H04L 63/1441 726/1 |
| 2015/0381641 A1 | 12/2015 | Cabrera et al. |
| 2015/0381649 A1 | 12/2015 | Schultz et al. |
| 2016/0006749 A1* | 1/2016 | Cohen ................... G06Q 40/12 726/23 |
| 2016/0065608 A1 | 3/2016 | Futty |
| 2016/0072836 A1 | 3/2016 | Hadden |
| 2016/0103992 A1 | 4/2016 | Roundy |
| 2016/0119379 A1 | 4/2016 | Nadkarni |
| 2016/0164893 A1* | 6/2016 | Levi ..................... H04L 63/1416 726/23 |
| 2016/0241580 A1 | 8/2016 | Watters et al. |

(56) References Cited

U.S. PATENT DOCUMENTS

2016/0241581 A1     8/2016   Watters et al.
2017/0237762 A1     8/2017   Ogawa

OTHER PUBLICATIONS

Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.
Non Final Office Action for U.S. Appl. No. 14/677,493, dated Aug. 24, 2017, 31 pages.
Final Office Action from U.S. Appl. No. 14/674,679, dated Sep. 22, 2016, 19 pages.
Final Office Action from U.S. Appl. No. 14/675,176, dated Nov. 25, 2016, 21 pages.
Final Office Action from U.S. Appl. No. 14/675,176, dated Sep. 25, 2017, 31 pages.
Final Office Action from U.S. Appl. No. 14/677,493, dated Nov. 13, 2018, 20 pages.
Final Office Action from U.S. Appl. No. 14/824,262, dated Apr. 6, 2017, 22 pages.
Final Office Action from U.S. Appl. No. 14/956,589, dated Nov. 22, 2017, 27 pages.
Final Office Action from U.S. Appl. No. 15/924,759, dated Aug. 1, 2018, 13 pages.
Final Office Action from U.S. Appl. No. 16/107,979, dated Jun. 13, 2019, 14 pages.
Final Office Action from U.S. Appl. No. 14/677,493, dated Nov. 25, 2016, 23 pages.
Final Office Action received for U.S. Appl. No. 16/182,914, dated Sep. 18, 2019, 6 pages.
Non-Final Office Action from U.S Appl. No. 15/886,183), dated Mar. 22, 2018, 21 pages.
Non-Final Office Action from U.S Appl. No. 16/107,972, dated Dec. 31, 2018, 11 pages.
Non-Final Office Action from U.S Appl. No. 16/142,913, dated Apr. 30, 2019, 33 pages.
Non-Final Office Action from U.S. Appl. No. 14/674,679, dated Jun. 2, 2016, 16 pages.
Non-Final Office Action from U.S. Appl. No. 14/675,075, dated Jul. 11, 2016, 13 pages.
Non-Final Office Action from U.S. Appl. No. 14/675,176, dated Apr. 17, 2017, 22 pages.
Non-Final Office Action from U.S. Appl. No. 14/675,176, dated Jul. 18, 2016, 18 pages.
Non-Final Office Action from U.S. Appl. No. 14/677,493, dated Aug. 2, 2019, 26 pages.
Non-Final Office Action from U.S. Appl. No. 14/677,493, dated Jul. 11, 2016, 17 pages.
Non-Final Office Action from U.S. Appl. No. 14/677,493, dated May 1, 2017, 25 pages.
Non-Final Office Action from U.S. Appl. No. 14/677,493, dated May 14, 2018, 23 pages.
Non-Final Office Action from U.S. Appl. No. 14/689,926, dated May 8, 2017, 34 pages.
Non-Final Office Action from U.S. Appl. No. 14/689,973, dated Jan. 25, 2017, 18 pages.
Non-Final Office Action from U.S. Appl. No. 14/824,262, dated Jul. 13, 2017, 20 pages.
Non-Final Office Action from U.S. Appl. No. 14/824,262, dated Oct. 7, 2016, 16 pages.
Non-Final Office Action from U.S. Appl. No. 14/956,589, dated May 31, 2017, 33 pages.
Non-Final Office Action from U.S. Appl. No. 14/956,615, dated Jul. 28, 2017, 46 pages.
Non-Final Office Action from U.S. Appl. No. 15/699,454, dated Feb. 8, 2018, 19 pages.
Non-Final Office Action from U.S. Appl. No. 15/845,963, dated Feb. 12, 2018, 27 pages.
Non-Final Office Action from U.S. Appl. No. 15/924,759, dated Feb. 26, 2019, 20 pages.
Non-Final Office Action from U.S. Appl. No. 16/107,975, dated Jan. 4, 2019, 11 pages.
Non-Final Office Action from U.S. Appl. No. 16/107,979, dated Oct. 18, 2018, 14 pages.
Non-Final Office Action from U.S. Appl. No. 16/182,914, dated May 30, 2019, 23 pages.
Notice of Allowance from U.S. Appl. No. 14/674,679, dated Apr. 18, 2017, 20 pages.
Notice of Allowance from U.S. Appl. No. 14/689,926, dated Nov. 8, 2017, 22 pages.
Notice of Allowance from U.S. Appl. No. 14/689,973, dated Jul. 27, 2017, 33 pages.
Notice of Allowance from U.S. Appl. No. 14/824,262, dated Nov. 22, 2017, 7 pages.
Notice of Allowance from U.S. Appl. No. 14/956,589, dated Apr. 23, 2018, 21 pages.
Notice of Allowance from U.S. Appl. No. 14/956,615, dated Dec. 18, 2017, 19 pages.
Notice of Allowance from U.S. Appl. No. 15/699,454, dated Aug. 9, 2018, 11 pages.
Notice of Allowance from U.S. Appl. No. 15/845,963, dated Jun. 26, 2018, 11 pages.
Notice of Allowance from U.S. Appl. No. 15/886,183, dated Sep. 19, 2018, 9 pages.
Notice of Allowance from U.S. Appl. No. 15/924,759, dated Jun. 13, 2019, 21 pages.
Notice of Allowance from U.S. Appl. No. 16/107,972, dated May 9, 2019, 18 pages.
Notice of Allowance from U.S. Appl. No. 16/107,975, dated May 13, 2019, 18 pages.
Notice of Allowance from U.S. Appl. No. 16/142,913, dated Aug. 30, 2019, 21 pages.
Notice of Allowance received for U.S. Appl. No. 16/107,979, dated Oct. 7, 2019, 14 pages.
Non-Final Office Action, US App. No., dated Mar. 19, 2020, 18 pages.
Notice of Allowance, U.S. Appl. No. 16/182,914, dated Mar. 6, 2020, 2 pages.
Final Office Action, U.S. Appl. No. 14/677,493, dated Jan. 16, 2020, 16 pages.
Non-Final Office Action, U.S. Appl. No. 16/042,283, dated Jan. 24, 2020, 25 pages.
Notice of Allowance, U.S. Appl. No. 14/675,176, dated, Dec. 30, 2019, 6 pages.
Notice of Allowance, U.S. Appl. No. 16/182,914, dated Dec. 4, 2019, 5 pages.
Non-Final Office Action, U.S. Appl. No. 14/675,176, dated Jul. 14, 2020, 18 pages.
Non-Final Office Action, U.S. Appl. No. 14/677,493, dated Jul. 14, 2020, 18 pages.
Non-Final Office Action, U.S. Appl. No. 16/539,918, dated Jul. 16, 2020, 14 pages.
Notice of Allowance, U.S. Appl. No. 16/042,283, dated Jul. 28, 2020, 17 pages.

\* cited by examiner

IDENTIFYING RELATED COMMUNICATION INTERACTIONS TO A SECURITY THREAT IN A COMPUTING ENVIRONMENT

RELATED APPLICATIONS

This application is related to and claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014, U.S. Provisional Patent Application No. 62/106,830, entitled "ACTION RECOMMENDATIONS FOR ADMINISTRATORS IN A COMPUTING ENVIRONMENT," filed on Jan. 23, 2015, and U.S. Provisional Patent Application No. 62/106,837, entitled "SECURITY ACTIONS IN A COMPUTING ENVIRONMENT," filed on Jan. 23, 2015, and which are hereby incorporated by reference in their entirety.

TECHNICAL FIELD

Aspects of the disclosure are related to computing environment security, and in particular to implementing responses to security threats based on related communication interactions.

TECHNICAL BACKGROUND

An increasing number of data security threats exist in the modern computerized society. These threats may include viruses or other malware that attacks the local computer of the end user, or sophisticated cyber-attacks to gather data and other information from the cloud or server based infrastructure. This server based infrastructure includes real and virtual computing devices that are used to provide a variety of services to user computing systems, such as data storage, cloud processing, web sites and services, amongst other possible services. To protect applications and services, various antivirus, encryption, and firewall implementations may be used across an array of operating systems, such as Linux and Microsoft Windows.

Further, some computing environments may implement security information and event management (SIEM) systems and other security detection systems to provide analysis of security alerts generated by network hardware and applications. In particular, SIEM systems allow for real-time monitoring, correlation of events, notifications, and console views for end users. Further, SIEM systems may provide storage logs capable of managing historical information about various security events within the network. Although SIEMs and other security identifying systems may generate security alerts for devices within the network, administrators may be forced to identify background information about each of the threats, and translate the gathered information into security actions. Thus, time and resources that could be used on other tasks may be used in researching and determining an appropriate course of action to handle a security threat.

Overview

The technology disclosed herein enhances how security threats are processed within a computing environment. In one example, a method of operating an advisement system includes identifying a security threat within the computing environment, wherein the computing environment comprises a plurality of computing assets. The method further provides obtaining descriptor information for the security threat, and obtaining related communication interactions based on the descriptor information. The method also includes generating a response to the security threat based on the related communication interactions.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
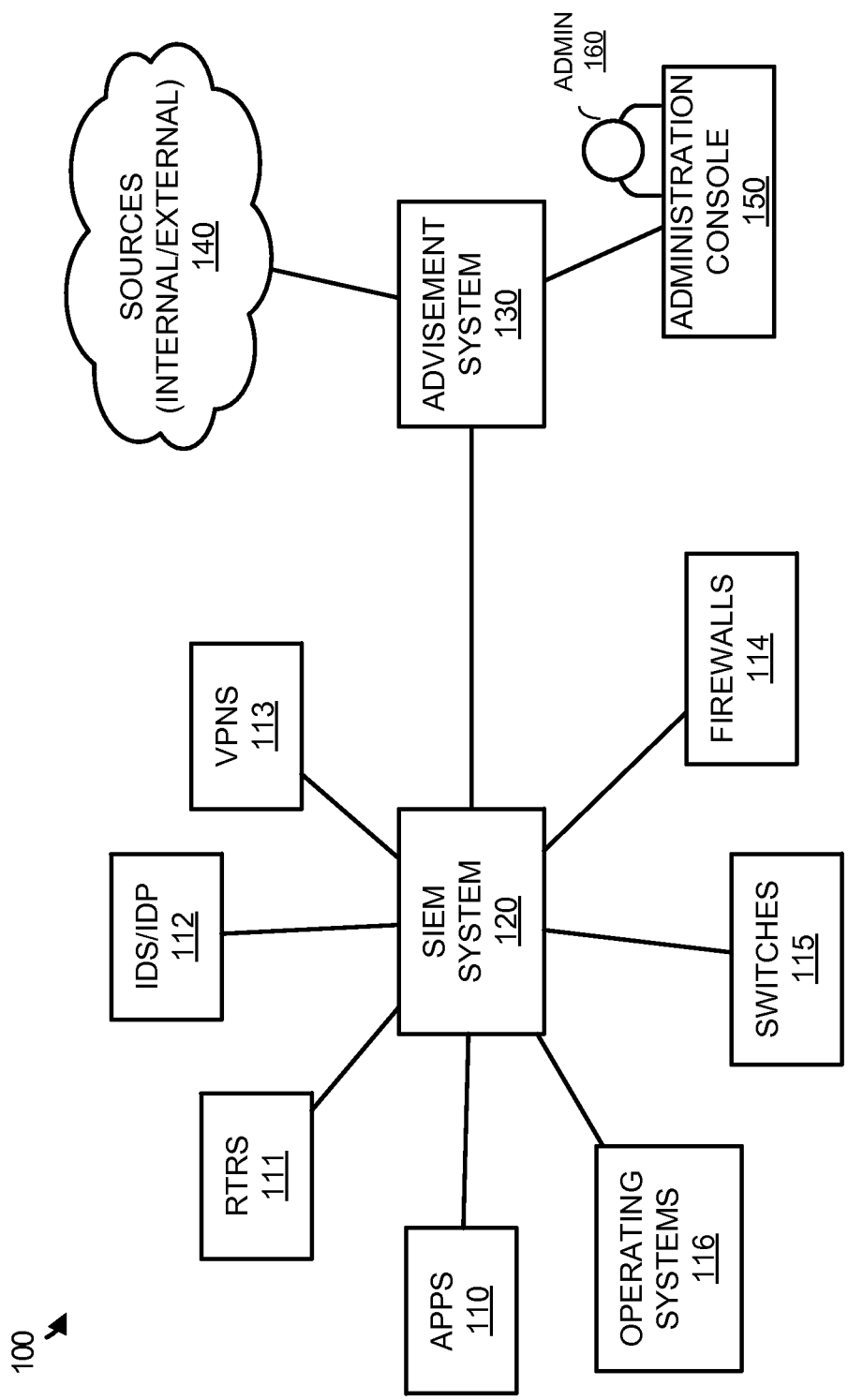
FIG. 1 illustrates a computing environment to manage and implement security actions.

The various examples disclosed herein provide for generating responses to security threats based on communication interactions related to the security threat. In many situations, organizations may employ a variety of computing assets, which may include various hardware and processes. During the operation of the hardware and process, security incidents or threats may occur, which inhibit the operation of the assets and the environment as a whole. To take actions against the security threats, an advisement system may be coupled to the computing environment, which is capable of identifying security threats within the environment and taking actions against the identified threats.

In particular, the advisement system may obtain reports of security threats from users of computing assets in the computing environment, security information and event management (SIEM) system reports of threats in the computing environment, computing asset reports of threats in the computing environment, or any other similar reports of security threats. In response to a security threat, the advisement system may gather supplemental information about the threat to determine the functionality and severity that the threat poses to the environment. For example, the advisement system may query internal and external databases and websites to determine what type and how severe the security threat is to the organization's assets.

Further, in some implementations, the advisement system may identify related communication interactions to assist in identifying the threat and the appropriate response to the threat. These related communication interactions may comprise email interactions, instant message interactions, downloads, or any other similar communication interaction. To identify the related interactions, the advisement system may obtain descriptor characteristics or information for the particular threat. For example, if a threat were reported to the advisement system about a suspicious email received on a first computing asset, the advisement system may determine an internet protocol (IP) address for the threat, a domain name or uniform resource identifier (URL) for the threat, a user name associated with the threat, or any other similar information. Once the characteristics are received, the device may then identify communications within the organization that correspond to the characteristics. Accordingly, if a plurality of computing assets received the same email, the advisement system may be able to identify that the email is part of a spear-phishing campaign that attempts to gather sensitive information from users within the organization.

Upon identifying the related communications within the environment, the advisement system may generate a response to the security threat based on the related communication interactions. In some implementations, the advisement system may be configured to automate a response to the security threat. Referring to the example of the spear-phishing campaign, the advisement system may automate a process to block future emails from the malicious IP address. In addition to or in place of the automated response, the advisement system may further determine suggested actions that can be provided to an administrator of the environment. Once provided to the administrator, the administrator may select an action to be implemented, which will then be applied by the advisement system to the required assets of the environment.

In at least one example, the advisement system may be configured with connectors or software modules that can be used to automate the implementation of security actions within computing environment. As described herein, computing environments may include a plurality of computing assets with varying hardware and software configurations. Accordingly, the connectors may be used to take a unified command, and translate the command to the required processes to implement a security action. Accordingly, if an action is to be implemented across multiple assets with different firewall configurations, the advisement system may use the appropriate connector and processes to implement the desired modification for each firewall.

To further illustrate the operation of an advisement system within a computing network, FIG. 1 is provided. FIG. 1 illustrates a computing environment 100 to manage and implement security actions. Computing environment 100 includes computing assets 110-116, SIEM system 120, advisement system 130, sources 140, and administration console 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, tablet computers, and the like. Although not illustrated in the present example, in some implementations, assets may be defined at computing system level. Accordingly, assets may be defined as physical computing systems, such as servers, end user computing systems, host computing systems, and the like, and may further be defined as virtual computing systems, such as virtual machines executing via host computing systems. These physical and virtual computing systems may include an operating system, applications, processes, firewalls, and other similar computing resources.

SIEM system 120, advisement system 130, internal and external sources 140, and administration console 150 may each include communication interfaces, network interfaces, processing systems, computer systems, microprocessors, storage systems, storage media, or some other processing devices or software systems, and can be distributed among multiple devices. SIEM system 120, advisement system 130, and sources 140 may comprise one or more server, desktop, laptop, or other similar computing devices. Administration console 150 may comprise an end user device, such as a desktop computer, laptop computer, smartphone, tablet, or any other similar computing device.

Advisement system 130 communicates with SIEM system 120, sources 140, and administration console 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, SIEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions, or to receive an incident report.

In operation, SIEM system 120 receives data and performance information from assets 110-116 and performs inspections to identify possible security threats. Once SIEM system 120 identifies a possible security threat, information about the security threat is transferred to advisement system 130. Advisement system 130 identifies the security threat and analyzes the threat to determine an appropriate action to be taken against the threat. This analyzing of the threat may include gathering descriptor information for the threat, such as IP addresses, user names, and domain names for the threat, and identifying related communication interactions based on the descriptor information. These related communications may be used to identify the severity of the threat, the identity of the threat, or any other similar information about the threat. Based on the related communication information, as well as enrichment information about the threat gathered from sources 140, security actions may be determined for the particular threat.

Figure 2:
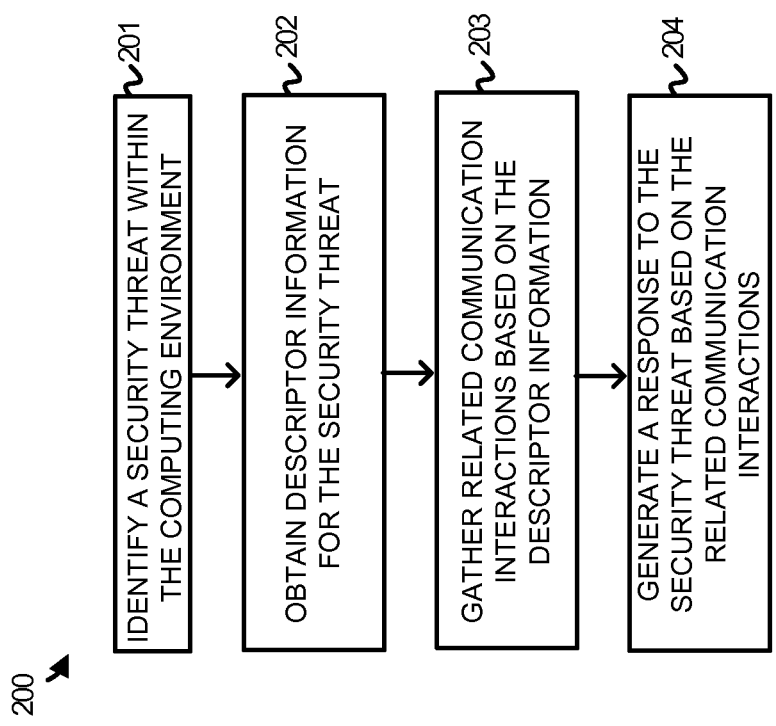
FIG. 2 illustrates a method of operating an advisement system to generate responses to a security threats based on communication information.

To further illustrate the operation of computing environment 100, FIG. 2 is provided. FIG. 2 illustrates a method 200 of operating advisement system 130 to generate responses to security threats based on communication information. In particular, as described in FIG. 1, SIEM system 120 receives information from a plurality of network assets 110-116 and identifies security threats based on the information. Once a threat is identified, the threat is transferred to advisement system 130. Advisement system 130 identifies the security threat or incident within computing environment 100 (201), and obtains descriptor information related to the security threat (202). This descriptor information is associated with identifiers for the security threat, such as usernames associated with the threat, IP addresses associated with the threat, domain names associated with the threat, or any other similar information. For example, if a threat were reported for a suspicious email, advisement system 130 may receive information regarding the domain name that the email was sent from, as well as information about the user that sent the email. This information may be received from SIEM system 120 or other security monitoring systems in the environment, may be determined based on a user report of the threat, may be received from the asset associated with the threat, or may be obtained in any other similar manner.

Once the descriptor information is obtained, advisement system 130 identifies related communication interactions based on the descriptor information (203). These related communication interactions may include related email interactions, related instant messages, or any other similar message. For example, a domain name may be identified in an email associated with an identified threat. Based on the domain name, other emails to other users of assets in the environment may be flagged to determine if the particular emails correspond to a phishing scheme, or some other malicious attempt to retrieve data from users of the environment. To determine the type of threat, advisement system 130 may provide textual analysis to determine keywords or phrases within the communications to determine the type of information requested in the communication. Further, in some implementations, advisement system 130 may search and identify attachments in the communications to determine possible phishing or virus threats within the attachments.

Once the related communication interactions are identified, advisement system 130 generates a response to the security threat based on the related communications (204). In some examples, the response may be generated based on the number of identified related messages, the content of the related messages, or any other similar information associated with the messages. For instance, if a plurality of emails were delivered from the same user, wherein each of the messages included a request for personal information, the response to the threat may include blocking future emails from the identified user.

In some implementations, the response to the threat may be automated, wherein advisement system 130 may provide the required procedures to implement the action. However, in addition to or in place of the automated action, advisement system 130 may provide a list of one or more actions to administrator 160 based on the related communications. Once the actions are provided to the administrator, the administrator may select at least one desired action to be implemented within the environment. In at least one example, advisement system 130 may be configured with connectors or software modules that can be used to translate action requests into the desired procedures for various hardware and software configurations. Accordingly, if administrator 160 selected an action to be implemented across multiple devices, advisement system 130 may translate the action to required processes for each hardware and software configuration of the devices.

As illustrated in FIG. 1, advisement system 130 may further communicate with internal and external sources 140 to assist in determining a response to a security threat. In particular, sources 140, which may comprise a website, database, or some other similar source, may provide information about an identified threat. For example, if an IP address were identified as being a provider for a possible security threat, databases and websites may be queried to determine information related to the IP address. For example, a website may maintain information about whether an IP address is associated with phishing scheme, whether the IP address is associated with malicious processes, or any other information about the process.

In some implementations, advisement system 130 may use content from the related communications to search for enrichment information within sources 140. In particular, advisement system 130 may retrieve various emails, instant messaging conversations, or other similar communications related to the threat, and based on the content of the communications, retrieve enrichment information within sources 140. For instance, if related communications included a link to download a file, advisement system 130 may query sources 140 to determine information about the file, such as whether the file is malicious, and what threat it poses to the environment.

Although illustrated in FIG. 1 with a SIEM system, it should be understood that in some examples other systems, such as the assets within the computing environment, might be used to identify security threats. Further, although illustrated separate in the example of FIG. 1, it should be understood that SIEM system 120 might reside wholly or partially on the same computing systems as advisement system 130.

Figure 3:
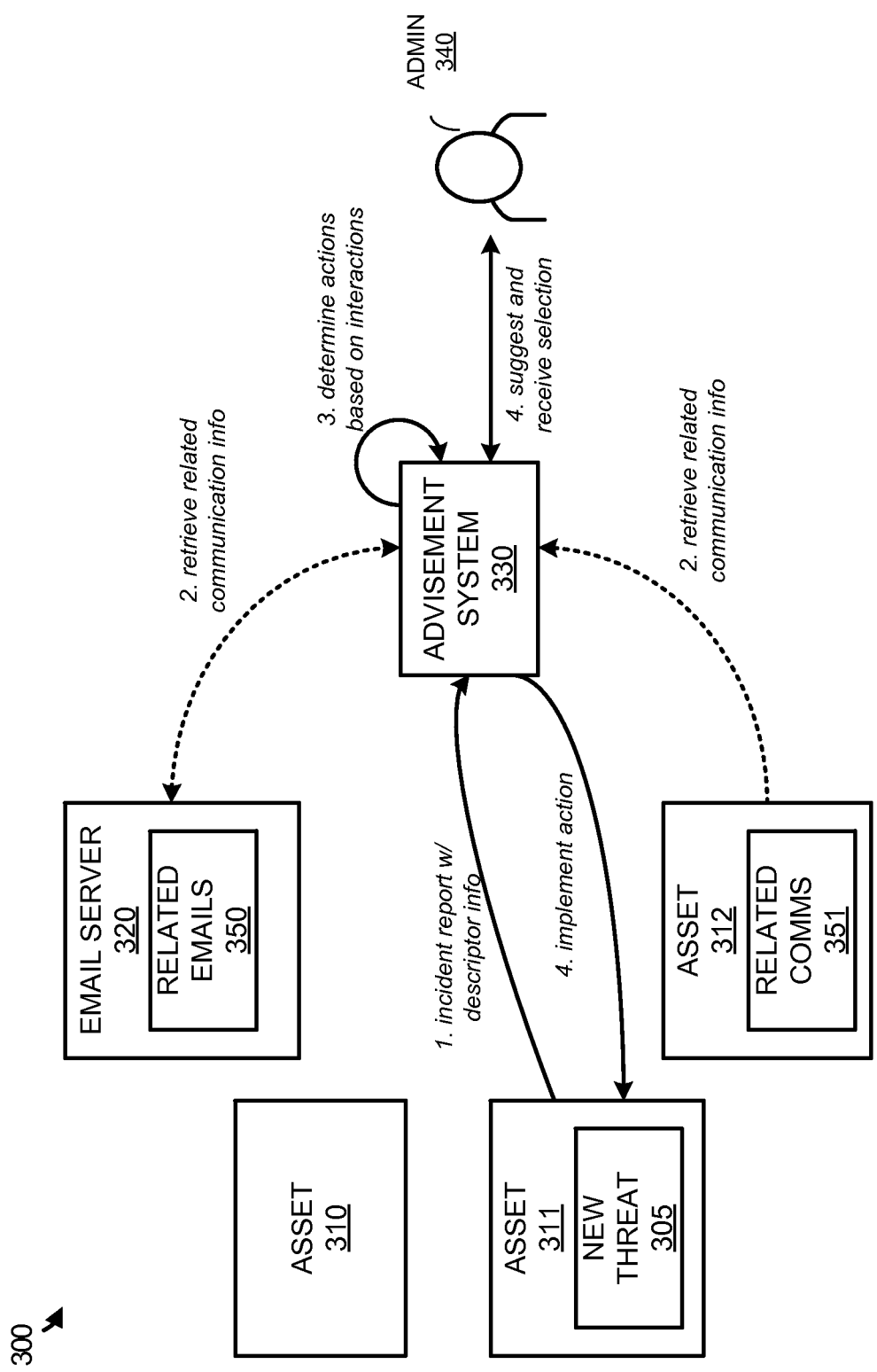
FIG. 3 illustrates an operational scenario for identifying security actions in response to a security threat.

Referring now to FIG. 3, FIG. 3 illustrates an operational scenario 300 for identifying security actions in response to a security threat. Operational scenario 300 includes new incident 305, assets 310-312, email server 320, advisement system 330, and administrator 340. Assets 310-312 may comprise end user computing devices, virtual machines, server computing systems, routers, switches, or any other similar computing system or asset, including combinations thereof. Although illustrated with three assets in the present example, it should be understood that a computing environment may include any number of assets. Further, in some implementations, email server 320 may be considered a computing asset for the computing environment.

As illustrated, asset 311 encounters a possible security threat 305, which is reported to advisement system 330. This report may originate from asset 311, may originate from a user associated with asset 311, may originate from a SIEM system for the environment, or may originate from any other similar security hardware or process. New threat 305 may comprise a suspicious email, a suspicious message, or any other similar communication interaction. These suspicious emails and messages may include requests for personal or sensitive information, unknown attachments, or any other similar data. In response to identifying the threat, advisement system 330 retrieves related communication information from other computing systems and assets within the environment. These related communications may possess the same source username as new threat 305, may possess the same root IP address as new threat 305, may possess the same domain name as new threat 305, or may include similar content to the content of new threat 305. In particular, as illustrated, advisement system retrieves related emails 350 from email server 320, and retrieves other related communications 351 from asset 312. Once the information is obtained from email server 320 and asset 312, advisement system 330 may determine actions based on the communication interactions.

In some implementations, to determine the security actions against new threat 305, advisement system 330 may identify actions based on the content and the number of related communications that are identified within the environment. For example, if a large number of communications are identified within the computing environment from an unknown IP address, wherein the communications ask users in the environment for personal information, such as credit card numbers, passwords, and the like, advisement system 330 may identify that the emails are related to a phishing scheme. Once the type of threat is identified, advisement system 330 may implement actions based on the type of threat that is presented in the environment.

Once the actions are selected, in some examples, advisement system 330 may be configured to implement the actions without further input from an administrator of the environment. For example, if a threat is associated with a particular IP address, advisement system 330 may initiate implementation of a firewall rule to block future communications from the IP address. In addition to or in place of the automated response from advisement system 330, advisement system 330 may be configured to provide one or more action recommendations to administrator 340. These actions may be provided via a user interface on advisement system 330 or to an administration console associated with administrator 340. Once the action recommendations are provided, the user may select or input a particular action, and advisement system may initiate implementation of the action within the environment. For example, administrator 340 may be provided with action options to block communications from a particular username, or to monitor future communications from the particular username. If the administrator selects to monitor for future communications from the username, advisement system 330 may be used to implement the necessary flags to identify communications from the desired username.

In some implementations, in addition to obtaining related communication information from various assets within the environment, advisement system 330 may use the information gathered from the assets to gather enrichment information about new threat 305. For example, advisement system 330 may obtain username, IP address, domain name, communication content, and other information about the threat from the related communications, and query internal and external sources to obtain supplemental information about the threat. Once the enrichment information is obtained, one or more actions may be defined based on the supplemental information for the presented threat. For example, a suspicious URL may be identified within a plurality of related emails. In response to identifying the URL, advisement system 330 may query a database to determine if any information is available for the URL. If the database returns that the URL is malicious, advisement system 330 may implement an action to prevent users from being able to access the URL. However, if the URL is determined not to be malicious, advisement system 330 may allow user to select the URL and monitor future communication interactions with the source of the URL.

Figure 4:
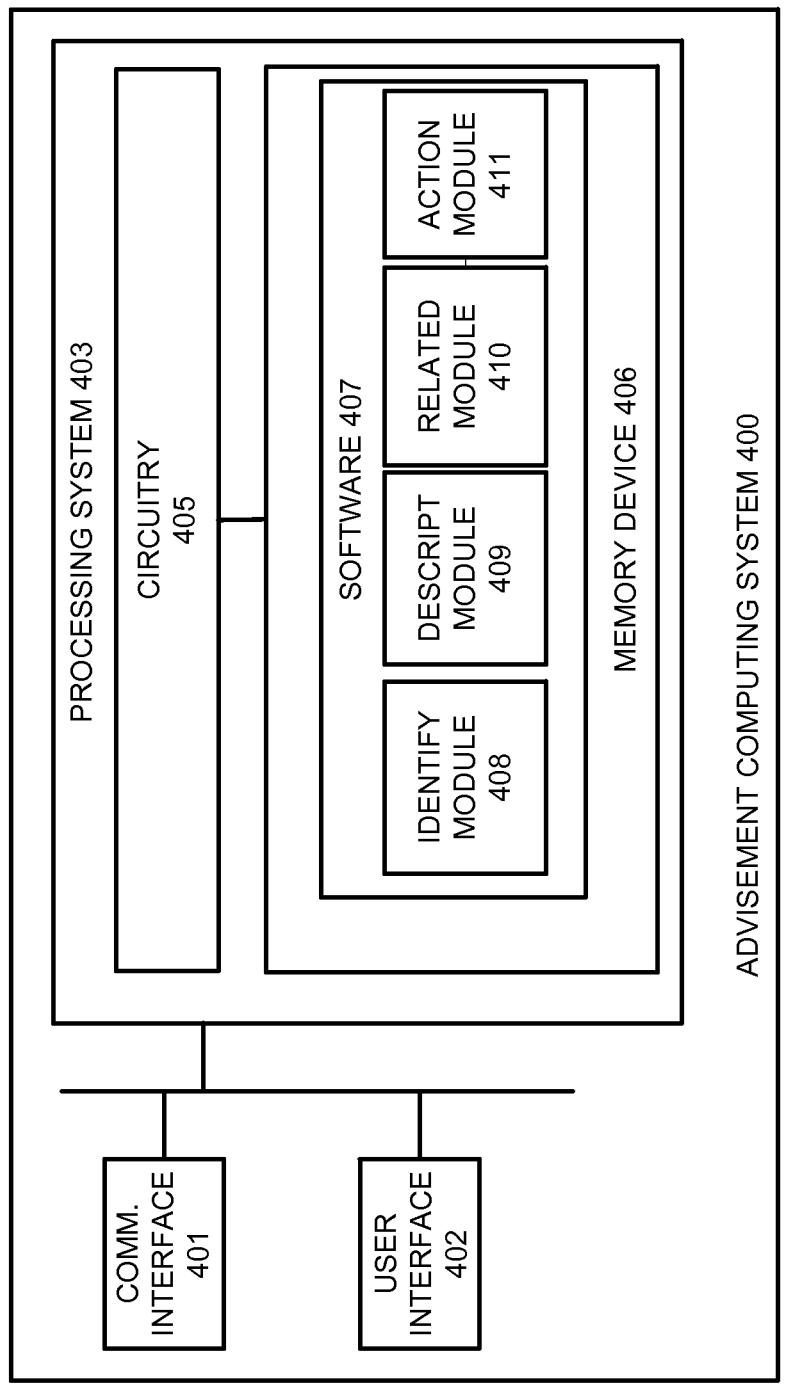
FIG. 4 illustrates an advisement computing system for providing security actions in response to security threats.

FIG. 4 illustrates an advisement computing system 400 to provide action recommendations for a plurality of network assets. Advisement computing system 400 is representative of a computing system that may be employed in any computing apparatus, system, or device, or collections thereof, to suitably implement the advisement systems described herein. Computing system 400 comprises communication interface 401, user interface 402, and processing system 403. Processing system 403 is communicatively linked to communication interface 401 and user interface 402. Processing system 403 includes processing circuitry 405 and memory device 406 that stores operating software 407.

Communication interface 401 comprises components that communicate over communication links, such as network cards, ports, radio frequency (RF) transceivers, processing circuitry and software, or some other communication devices. Communication interface 401 may be configured to communicate over metallic, wireless, or optical links. Communication interface 401 may be configured to use TDM, IP, Ethernet, optical networking, wireless protocols, communication signaling, or some other communication format—including combinations thereof. In particular, communication interface 401 may communicate with security identification systems, such as SIEM systems, security processes on the assets themselves, or some other security identification system. Further, communication interface 401 may be configured to communicate with one or more administration consoles to provide the suggested actions to administrators, and the computing assets of the environment to implement selected actions.

User interface 402 comprises components that interact with a user. User interface 402 may include a keyboard, display screen, mouse, touch pad, or some other user input/output apparatus. User interface 402 may be omitted in some examples.

Processing circuitry 405 comprises microprocessor and other circuitry that retrieves and executes operating software 407 from memory device 406. Memory device 406 comprises a non-transitory storage medium, such as a disk drive, flash drive, data storage circuitry, or some other memory apparatus. Operating software 407 comprises computer programs, firmware, or some other form of machine-readable processing instructions. Operating software 407 includes identify module 408, descriptor (descript) module 409, related module 410, and action module 411, although any number of software modules may provide the same operation. Operating software 407 may further include an operating system, utilities, drivers, network interfaces, applications, or some other type of software. When executed by circuitry 405, operating software 407 directs processing system 403 to operate advisement computing system 400 as described herein.

In particular, identify module 408 is configured to, when executed by advisement computing system 400 and processing system 403, to identify a security incident for an asset within the computing environment. This security incident may be reported by a SIEM system, a security process on a computing asset, a user within the computing environment, or any other similar security process or system. Once a threat is identified, descriptor module 409 directs processing system 403 to obtain descriptor information for the security threat. This descriptor information may include various characteristics about the threat, including any IP address associated with the threat, any domain names or URLs associated with the threat, the content of any communications related to the threat, or any other similar information. In some implementations, the descriptor information may be provided with the report of the security threat. For example, if a user provided the threat, the user may input or provide the required descriptor information. However, in other implementations, descriptor module 409 may retrieve the required information by requesting the asset associated with the incident for the required information.

Once the descriptor information is obtained, related module 410 directs processing system 403 to identify or retrieve related communication interactions based on the descriptor information. To identify this information, computing system 400 may contact various other assets, such as email servers, other user computing systems, and the like to identify communications with qualified descriptor information. For example, computing system 400 may identify a username in an email associated with the security threat. After identifying the username, computing system 400 may contact one or more other assets in the computing environment to identify other communication interactions with the same username. Once the related communication interactions are retrieved, action module 411 directs processing system 403 to generate a response to the security threat based on the related communication interactions.

In some implementations, to generate the response to the security action, computing system 400 may identify the number of communication interactions, as well as the information requested in the communication interactions to determine the appropriate action. For example, if the threat comprised an email that asked for sensitive information such as passwords and social security numbers, the action may be different than if the threat comprised unsolicited email attachments and advertisements.

In some examples, once the related communications are identified, computing system 400 may use information from the collected communications to gather enrichment information from internal and external sources. These sources, which may comprise websites or other databases, may store information about the severity and/or the complexity of the security threat presented within the environment. For example, if a URL link were provided in emails associated with a threat, a search may be performed for the URL in one or more databases to determine the security risk of the URL. Based on the risk or properties identified by the external sources, a response may be generated for the security threat.

To provide the response to the security threat, advisement computing system 400 may be configured to implement one or more actions in the environment without input from an administrator of the environment. However, in addition to or in place of the automated actions, one or more action suggestions based on the related communication interactions may be provided to an administrator either locally via user interface 402 or externally via an administration console. Once provided, the user may select or provide input to select an action to be implemented in the environment. Upon selection, advisement computing system 400 will identify the selections, and initiate implementation of the actions within the environment.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method comprising:
   receiving, from a first computing asset of a computing environment comprising a plurality of computing assets, data indicating a security threat within the computing environment, the data identifying a first communication interaction associated with the security threat;
   identifying a characteristic of the first communication interaction;
   obtaining, from a second computing asset of the computing environment, one or more second communication interactions related to the first communication interaction, the one or more second communication interactions identified by the second computing asset based at least in part on the characteristic of the first communication interaction;
   identifying a network location contained in the one or more second communication interactions;
   obtaining enrichment information for the network location from a service external to the computing environment, the enrichment information indicating whether the network location is malicious;
   identifying an automated response based at least in part on the enrichment information; and
   initiating the automated response to mitigate the security threat in the computing environment, wherein initiating the automated response includes:
      identifying a connector associated with a computing asset involved in the automated response,
      using the connector to translate at least a portion of the automated response into an action to be performed by the computing asset in the computing environment, and
      causing the computing asset in the computing environment to perform the action.

2. The computer-implemented method of claim 1, wherein the plurality of computing assets includes at least one of: a user computing system, a server computing system, a router, a switch, or a virtual machine.

3. The computer-implemented method of claim 1, wherein the characteristic includes at least one of: an internet protocol (IP) address, a uniform resource locator (URL), a domain name, content contained in the first communication interaction, or a username.

4. The computer-implemented method of claim 1, wherein the related communication interactions include a second email interaction, and wherein the first communication interaction comprises a first email interaction that is related to the second email interaction.

5. The computer-implemented method of claim 1, further comprising:
   identifying one or more suggested actions to be implemented in at least one computing asset of the plurality of computing assets, the one or more suggested actions identified based on a type of the security threat;
   providing the one or more suggested actions to an administrator of the computing environment;
   identifying a selection of an action of the one or more suggested actions by the administrator of the computing environment; and
   initiating implementation of the action in the computing environment.

6. The computer-implemented method of claim 1, wherein the data indicating the security threat within the computing environment includes received from a security information and event management (SIEM) system.

7. The computer-implemented method of claim 1, wherein the data indicating the security threat within the computing environment includes a user-generated notification of the security threat within the computing environment.

8. The computer-implemented method of claim 1, further comprising identifying the automated response based at least in part on a number of the one or more second communication interactions.

9. The computer-implemented method of claim 1, wherein the first computing asset and the second computing asset are the same computing asset.

10. The computer-implemented method of claim 1, wherein the action is specific to a hardware or software configuration of the computing asset.

11. The computer-implemented method of claim 1, wherein initiating the automated response to the security threat in the computing environment includes using a first connector to translate at least a first portion of the automated response into one or more first actions used by a first computing asset at which the one or more first actions are to be performed and using a second connector to translate at least a second portion of the automated response into one or more second actions used by a second computing asset at which the one or more second actions are to be performed, wherein the one or more first actions are different from the one or more second actions.

12. The computer-implemented method of claim 1, further comprising identifying the automated response based at least in part on content contained in the one or more second communication interactions.

13. The computer-implemented method of claim 1, wherein the enrichment information is first enrichment information, wherein the method further comprises obtaining second enrichment information from a computing asset within the computing environment, and wherein the automated response to the security threat in the computing environment is initiated based at least in part on the first enrichment information and the second enrichment information.

14. The computer-implemented method of claim 1, further comprising determining, based at least in part on the one or more second communication interactions, that the security threat is a phishing campaign.

15. The computer-implemented method of claim 1, wherein the automated response includes at least one of: blocking receipt of future emails interactions related to the one or more second communication interactions, blocking an internet protocol (IP) address.

16. The computer-implemented method of claim 1, wherein the automated response is a first automated response, and wherein the method further comprises:
determining that at least one of the one or more second communication interactions includes a link to download a file;
determining that the file is malicious; and
initiating a second automated response in the computing environment based on determining that the file is malicious.

17. The computer-implemented method of claim 1, wherein the network location is a Uniform Resource Locator (URL) link.

18. The computer-implemented method of claim 1, further comprising:
determining, based on the enrichment information, a severity of the security threat; and
identifying the automated response based at least in part on the severity of the security threat.

19. An apparatus, comprising:
one or more non-transitory computer readable media; and
processing instructions stored on the one or more computer readable media that, when executed by a processing system, direct the processing system to:
receive, from a first computing asset of a computing environment comprising a plurality of computing assets, data indicating a security threat within the computing environment, the data identifying a first communication interaction associated with the security threat;
identify a characteristic of the first communication interaction;
obtain, from a second computing asset of the computing environment, one or more second communication interactions related to the first communication interaction, the one or more second communication interactions identified by the second computing asset based at least in part on the characteristic of the first communication interaction;
identify a network location contained in the one or more second communication interactions;
obtain enrichment information for the network location from a service external to the computing environment, the enrichment information indicating whether the network location is malicious;
identifying an automated response based at least in part on the enrichment information; and
initiate the automated response to mitigate the security threat in the computing environment, wherein initiating the automated response includes:
identifying a connector associated with a computing asset involved in the automated response,
using the connector to translate at least a portion of the automated response into an action to be performed by the computing asset in the computing environment, and
causing the computing asset in the computing environment to perform the action.

20. A non-transitory computer-readable storage medium storing instructions which, when executed by one or more processors, cause performance of operations comprising:
receiving, from a first computing asset of a computing environment comprising a plurality of computing assets, data indicating a security threat within the computing environment, the data identifying a first communication interaction associated with the security threat;
identifying a characteristic of the first communication interaction;
obtaining, from a second computing asset of the computing environment, one or more second communication interactions related to the first communication interaction, the one or more second communication interactions identified based at least in part on the characteristic of the first communication interaction;
identifying a network location contained in the one or more second communication interactions;
obtaining enrichment information for the network location from a service external to the computing environment, the enrichment information indicating whether the network location is malicious;
identifying an automated response based at least in part on the enrichment information; and
initiating an automated response to the security threat in the computing environment, wherein initiating the automated response includes:
identifying a connector associated with a computing asset involved in the automated response,
using the connector to translate at least a portion of the automated response into an action to be performed by the computing asset in the computing environment, and
causing the computing asset in the computing environment to perform the action.

* * * * *